Nov. 10, 1925.

E. STAHL

MILK BELL

Filed March 26, 1925

1,560,872

Inventor
Ernst Stahl
By his Attorney

Patented Nov. 10, 1925.

1,560,872

UNITED STATES PATENT OFFICE.

ERNST STAHL, OF NEW YORK, N. Y.

MILK BELL.

Application filed March 26, 1925. Serial No. 18,358.

*To all whom it may concern:*

Be it known that I, ERNST STAHL, a citizen of Germany, residing at New York, in the county of New York and State of New York, have invented certain new and useful Improvements in Milk Bells, of which the following is a specification.

This invention relates to devices for audibly announcing the rise in temperature in water, milk, or cocoa contained in a vessel, to a point where boiling takes place, as for instance, an egg boiler, where the bell will indicate a warning; and has as its principal object to provide an efficient audible signal operated directly by the ebulition of the liquid.

It is a further feature to provide a signalling device that may be applied or removed from any ordinary cooking vessel, in a ready manner and without the use of tools of any kind.

Another aim is to produce a device depending for its operation entirely upon natural gravitation, springs and like uncertain elements being wholly omitted.

These and other objects, such as simplicity, lightness of weight and adaptability, are attained by the novel construction and combination of parts hereafter described and shown in the accompanying drawing, forming part of this disclosure, and in which:—

Figure 1:
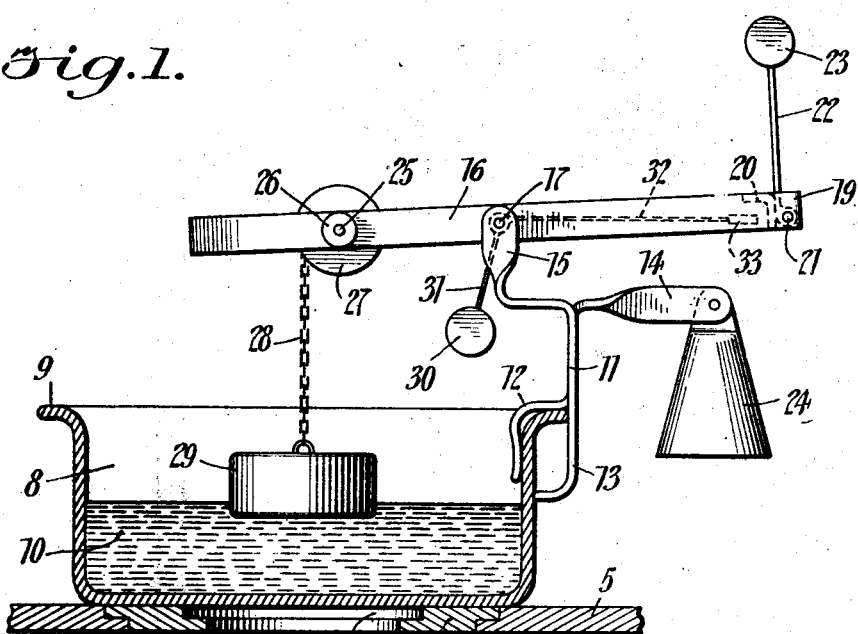
Figure 1 is a side elevational view of an embodiment of the invention indicating its application, the parts being in position for operation.
Figure 2:
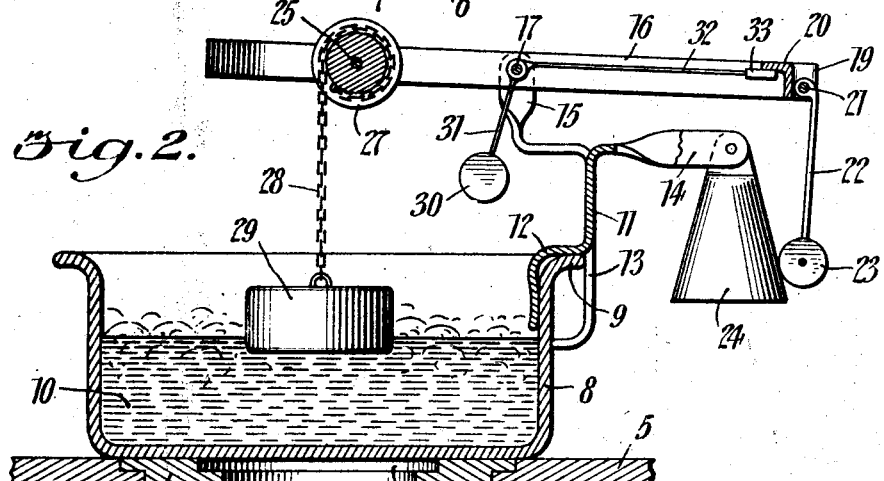
Figure 2 is a similar view of the same, the parts being shown in the position assumed after operation, the section portion of the view being taken on line 2—2 of Figure 3.
Figure 3:
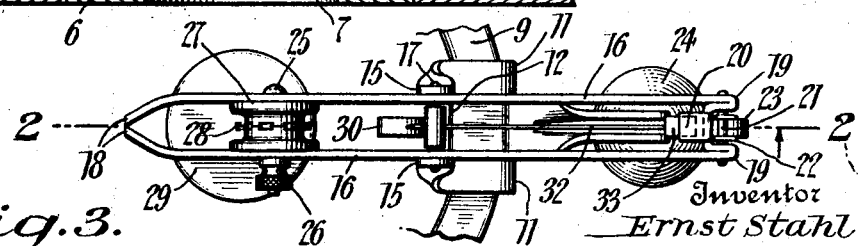
Figure 3 is a top plan view of Figure 2.

Referring more in detail to the drawing, the numeral 5 represents a fragmentary portion of a plate, such as a stove top, in which is supported a lid 6 having an opening 17 through which heat may pass to impinge upon the bottom of a cooking vessel 8, here shown as having an outwardly flanged ring, the vessel containing a quantity of water 10.

The device consists of a stand 11 cleft at its lower end to produce bent prongs 12 and 13, the former resting on the rim and extending partially into the vessel against the inner surface of its side wall, the other prong being disposed on the outer surface and bent to make contact with it.

The upper part of the stand 11 is shaped to present horizontal arms 14 and angularly bent, upturned arms 15, between which are pivoted the spaced members 16 of a tilting frame, on the pin 17, these members converging at one end 18 and are closely, reentrantly turned upon themselves at their opposite ends 19.

Held between the ends 19 is spacer 20, of right angled cross-section, and passing through the ends is a pin 21 on which is pivoted an arm 22 having a weighted striker 23 fixed at its free end, the same making contact, under certain conditions with a gong 24 fixed between the outer ends of the arms 14.

The normal position of the striker 23 is that shown in Figure 1, in which the arm 22 rests against the spacer 20 but when the frame is tilted to such an extent that the center of gravity of the striker falls outside the spacer, the striker describes a semicircle and hits the gong with considerable force.

At a point near the outer end of the frame elements 16 is a headed pin 25, one of its ends being screw-threaded to engage a thumb-nut 26, and mounted to rotate on the pin is a flanged spool 27 to which is attached one end of a light chain 28.

This chain may be wound adjustably on the spool and the spool clamped between the frame sides 16 by the nut 26, to maintain a float 29, supported by the chain, at any desired depth within the vessel, this float resting on the surface of the water.

It will be evident that when the water boils an uneven, bubbling surface is produced, sufficient to raise the weight and allow the tilting frame to swing, releasing the striker and giving a signal to indicate the condition of the water.

As the position of the float can be nicely adjusted in a convenient manner to suit the quantity of water in the vessel, the tilting frame can be set with accuracy to provide a proper signal.

A counterbalancing means is provided that prevents the striker from making a longer contact with the gong, the same consisting of a weight 30 carried by an arm 31 pivoted on the pin 17, another arm 32 extending between the swinging frame members to a head 33, this head engaging below the spacer 20 and operating to raise the outer end of the frame, clearing the striker from the gong, immediately it has delivered its stroke, thus preventing a dull or muffled sound from being produced.

From the foregoing it will be seen that an effective device for the purpose has been disclosed, but it will be understood that changes may be made in the structure presented within the limits of the appended claims.

Having thus described my invention, what I claim as new and desire to secure by Letters Patent, is:—

1. A signal of the class described comprising a standard engageable with a vessel containing water, a tilting frame pivoted in said standard, a gong fixed on a portion of said standard, a striker having an arm pivoted in the outer end of said frame, a float engaged at the opposite end of said frame to rest upon the surface of water in the vessel, and means in said frame adapted to retain the striker arm erect until said float has arisen a predetermined distance by boiling of the water.

2. A signal of the class described comprising a tilting frame, means for supporting said frame on the edge of a vessel, a bell on the supporting means, a lever arm having a striker on the outer end of said frame, said striker being normally raised, a pulley pivoted in said frame, a chain adjustably wound on the pulley, means for securing said pulley from rotation, and a weight suspended at the end of said chain to rest upon the surface of water in the vessel, said frame being tilted upon change in the surface of the water to release said striker and permit contact with said bell.

3. An audible signal for vessels in which water may be boiled to indicate the boiling thereof, said signal comprising a support having arms to engage the wall of the vessel, arms on the upper part of said support, a bell carried by one of said arms, a tilting frame pivoted in the other pair of arms, a bell striker having an arm pivoted in the outer end of said frame, means to normally retain said arm in a raised position, means, including a float at the other end of said frame, said float resting on the surface of water in the vessel, and permitting the frame to tilt upon change in the surface of the water, to displace said striker, and means to retract said frame immediately contact is made between the striker and bell.

In witness whereof I have affixed my signature.

ERNST STAHL.